United States Patent [19]

Cooke

[11] Patent Number: 5,257,687
[45] Date of Patent: Nov. 2, 1993

[54] FRICTION CLUTCH DRIVEN PLATES

[75] Inventor: Richard D. M. Cooke, Warwick, England

[73] Assignee: Automotive Products, plc, Leamington Spa, England

[21] Appl. No.: 917,158

[22] PCT Filed: Jan. 2, 1991

[86] PCT No.: PCT/GB91/00001

§ 371 Date: Jul. 8, 1992

§ 102(e) Date: Jul. 8, 1992

[87] PCT Pub. No.: WO91/10838

PCT Pub. Date: Jul. 25, 1991

[30] Foreign Application Priority Data

Jan. 10, 1990 [GB] United Kingdom ............... 9000520

[51] Int. Cl.$^5$ ............................................. F16D 13/64
[52] U.S. Cl. ............................... 192/106.2; 192/107 R; 464/68
[58] Field of Search ............... 192/70.17, 106.1, 106.2, 192/107 R; 464/68

[56] References Cited

U.S. PATENT DOCUMENTS

| | | |
|---|---|---|
| 1,862,991 | 6/1932 | Vargha . |
| 1,896,968 | 2/1933 | Paton ........................ 192/70.17 |
| 1,931,065 | 10/1933 | Drude . |
| 4,821,860 | 4/1989 | Crawford et al. ............. 192/107 C |
| 4,892,177 | 1/1990 | Lanzarini et al. ............. 192/106.2 |

FOREIGN PATENT DOCUMENTS

| | | |
|---|---|---|
| 113202 | 7/1984 | European Pat. Off. . |
| 2814059 | 10/1987 | Fed. Rep. of Germany . |
| 90/08908 | 8/1990 | World Int. Prop. O. . |

Primary Examiner—Richard M. Lorence
Attorney, Agent, or Firm—Paul E. Milliken; Lee A. Germain

[57] ABSTRACT

A friction clutch driven plate (10) having a hub (11) and friction facings (14, 15) which face in opposite directions. The friction facings are mounted on respective coaxial annular carrier plates (16, 17) which are rotatable about the hub (11) and are secured back to back with each other by the stop pins (22) which pass through aligned holes (26, 27) in the two carrier plates (16, 17). The holes (27) in at least one carrier plate (17) being enlarged to enable that carrier plate (17) to move rotationally relative to the other carrier plate (16), said relative rotation being resisted by springs (28) acting between the two carrier plates.

15 Claims, 5 Drawing Sheets

FRICTION CLUTCH DRIVEN PLATES

This invention relates to friction clutch driven plates for vehicles and in particular to friction clutch driven plates for cars.

A typical motor vehicle engine is connected to the vehicle gear box through a friction clutch which includes a pressure plate and flywheel connected to the engine, and a clutch driven plate sandwhiched therebetween which is connected to the vehicle gear box.

In order to smooth out the clutch engagement on take up of the drive from the engine, the clutch driven plate generally has some axial cushioning between its opposed friction facings, and a torsion damping means between the friction facings which engage the engine, and the driven plate hub which is connected to the gear box.

The present invention seeks to provide a different construction of clutch in which the two friction facings also have some degree of torsion damping operable therebetween during the clutch take up. This will help prevent clutch judder and give an improved clutch take-up.

Accordingly there is provided a friction clutch driven plate having a hub and friction facings which face in opposite directions, the friction facings for each direction are mounted on a respective coaxial annular carrier plate which is rotatable about the hub, each carrier being rotatable about the hub, the two carrier plates being secured back to back with each other such that one carrier plate can rotate relative to the other carrier plate, said rotation being opposed by resilient means.

Preferably the two carrier plates are secured by fastening means passing through aligned holes in the two carrier plates, said holes in at least one carrier plate being enlarged relative to the fastening means to enable said one carrier plate to move rotationally relative to the other carrier plate, said relative rotation being resisted by resilient means acting between the two carrier plates.

The relative rotation between the two carrier plates can only occur until the clamping load of the clutch springs prevents further relative rotation.

Preferably the carrier plates are annular steel plates with a plurality of radially projecting circumferentially spaced fingers around the outer peripheral edge thereof, and the friction facings are secured to the projecting fingers.

Preferably the hub has a radially outwardly extending flange, and the two carrier plates are secured by said fastening means to a disc adaptor arranged on one axial side of the hub flange, and the disc adaptor is secured by an axially extending fastening means to a retainer plate which is located on the other axial side of the flange, the axially extending fastening means passing through co-operating apertures in the hub flange which allow the disc adaptor and retainer plate to move rotationally about the hub, said rotational movement being resiliently opposed by torsion damping springs housed in aligned spring windows in the hub flange, disc adaptor, and retainer plate.

The fastening means, conveniently a rivet, utilised for holding the disc adaptor to the retainer plate may also be used to secure the carrier plates to the disc adaptor.

The invention will be described by way of example and with reference to the accompanying drawings in which.

Figure 1:
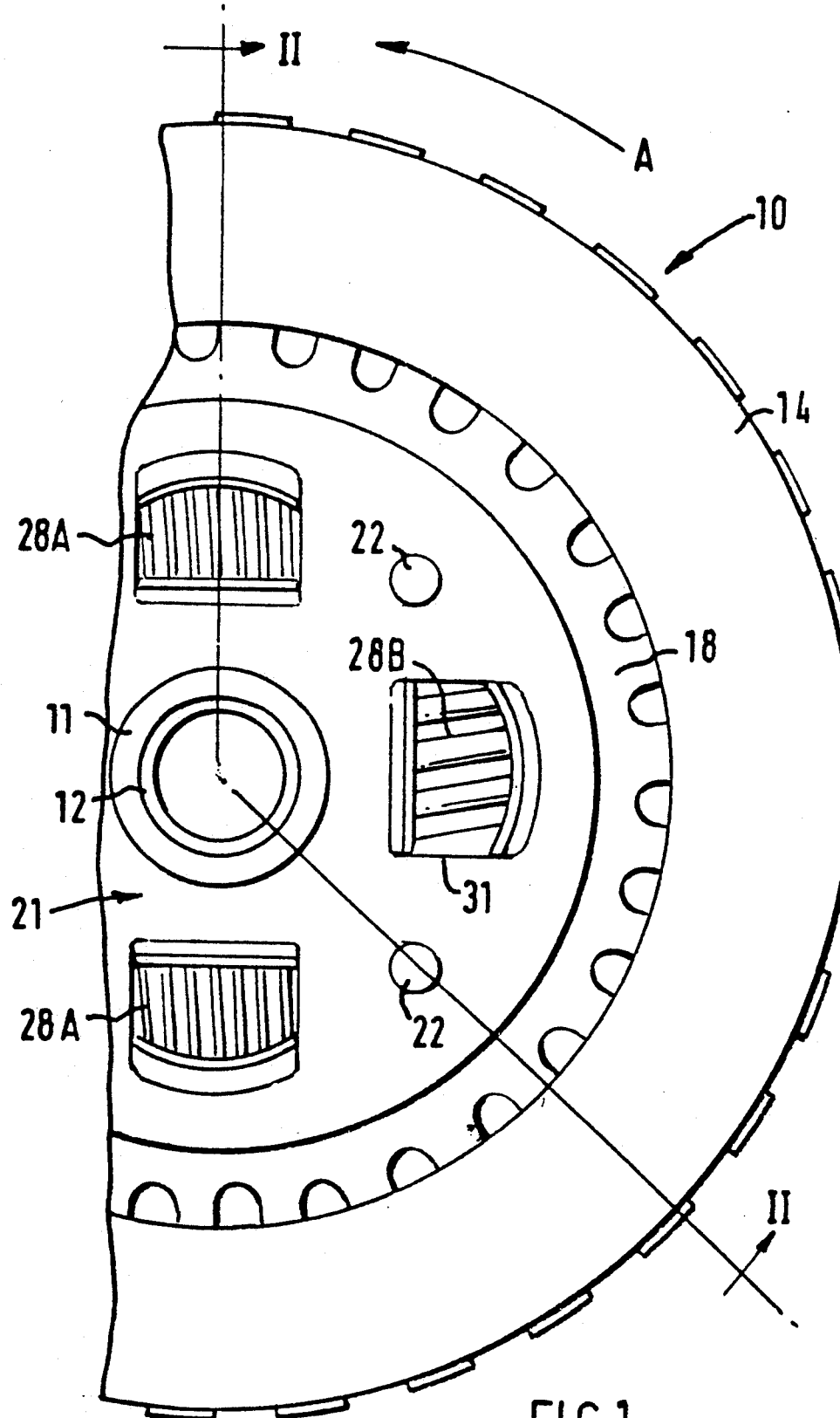
FIG. 1 is an elevation of a friction clutch driven plate according to the invention.

FIGS. 7a, 7b and 7c and 8a and 8b are schematic drawings showing the relationship between the spring windows of the various moving parts of the driven plate.

With reference to FIGS. 1 to 6 of the accompanying drawings, the illustrated friction clutch driven plate 10 comprises a hub 11 having internal splines 12 for connection with a gear box input shaft (not shown) and a radially outwardly extending annular flange 13.

A pair of annular friction facings 14 and 15 are each mounted on an annular carrier plate 16 and 17 respectively. Each carrier plate 16 and 17 is an annular plate having a plurality of circumferentially spaced radially extending fingers 18 projecting outwardly from its outer periphery.

Figures 2, 2A:
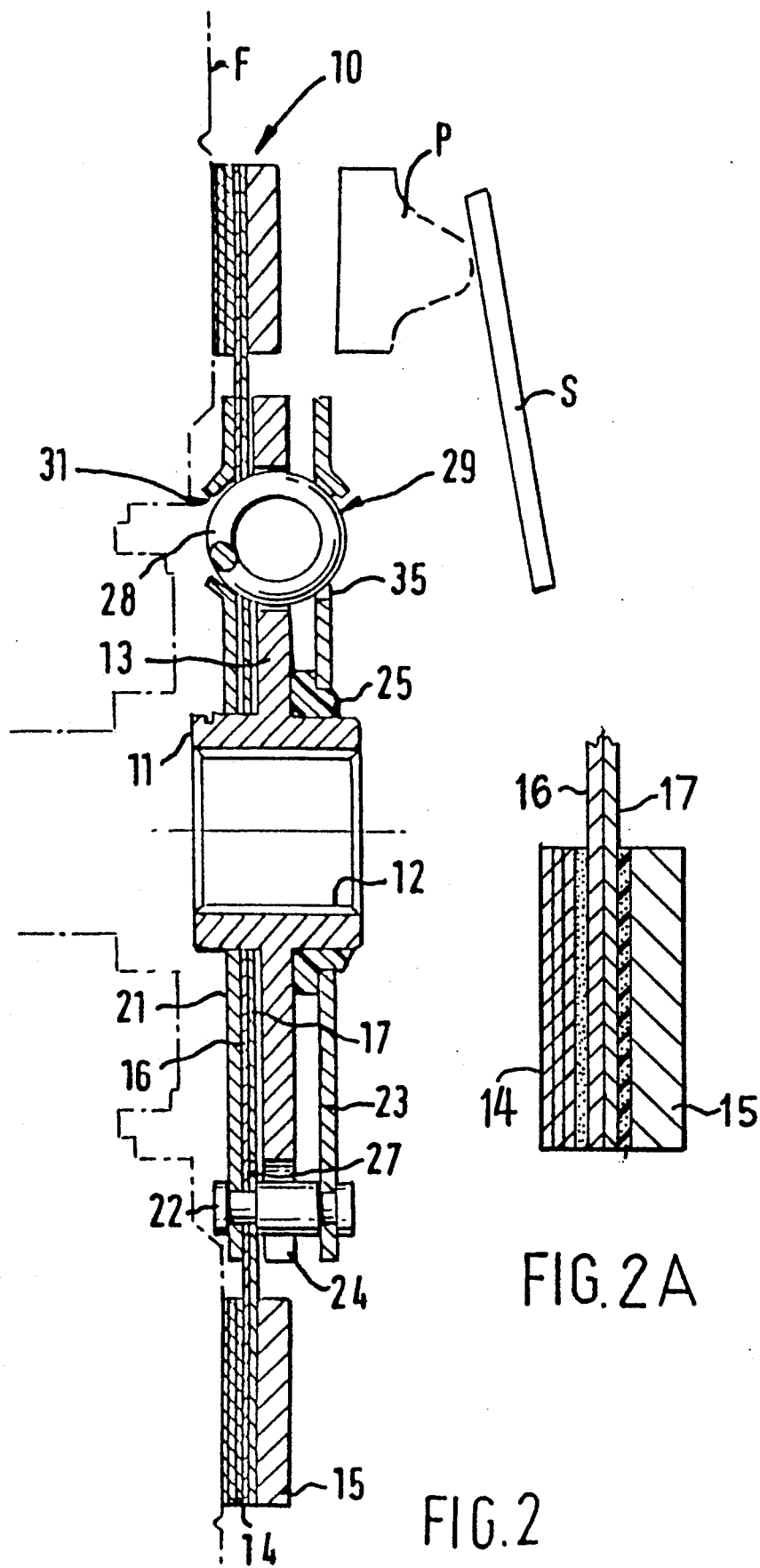
FIG. 2 is a section on the line II—II of FIG. 1 also showing a flywheel, pressure plate, and spring in broken lines.
FIG. 2A is a fragmentary cross-sectional view showing friction facings adhesively attached to carrier plates.
Figure 3:
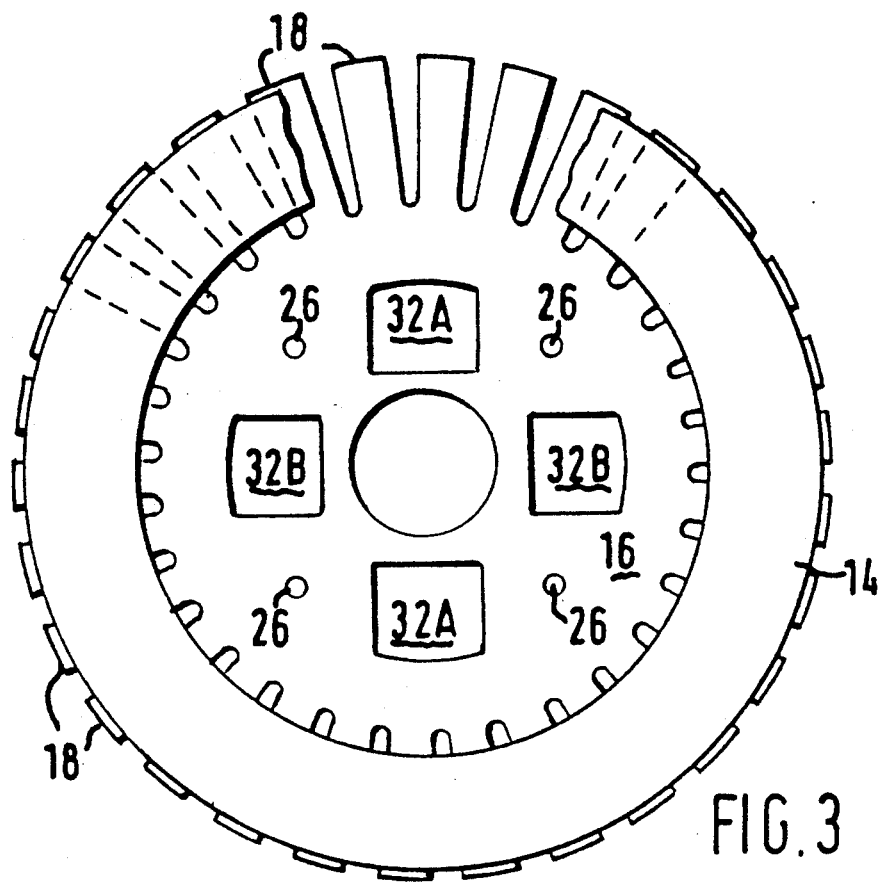
FIG. 3 is an elevation of the fixed carrier plate of the driven plate of FIG. 1.
Figure 4:
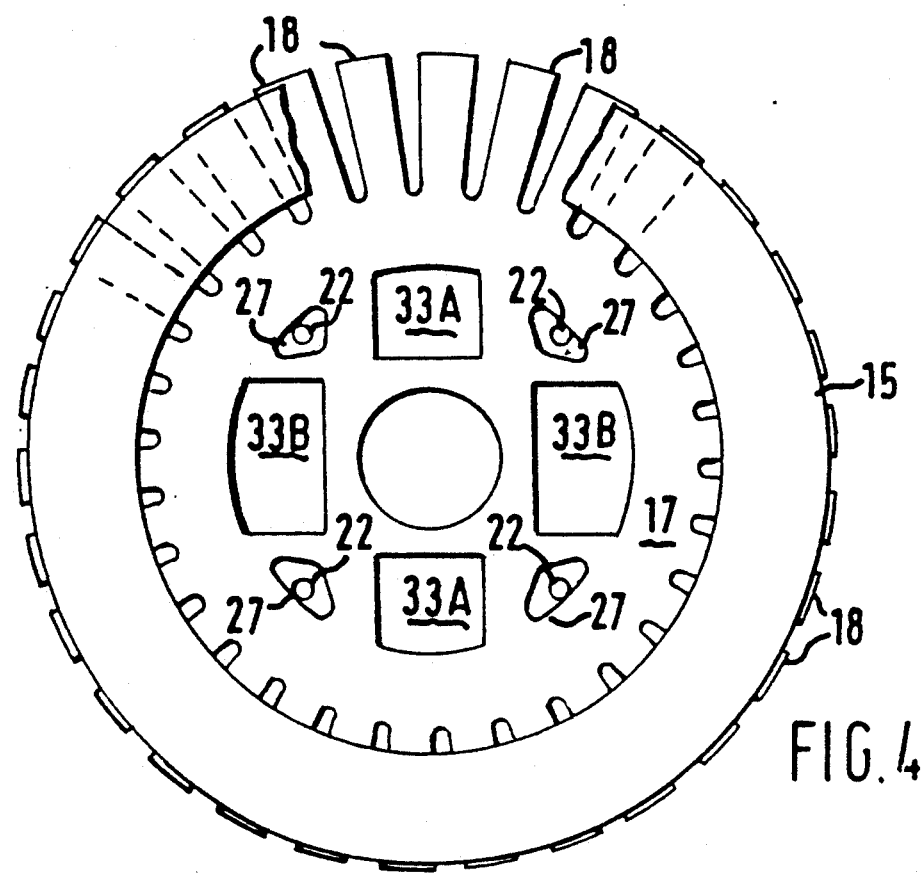
FIG. 4 is an elevation of the movable carrier plate of the driven plate of FIG. 1.
Figure 5:
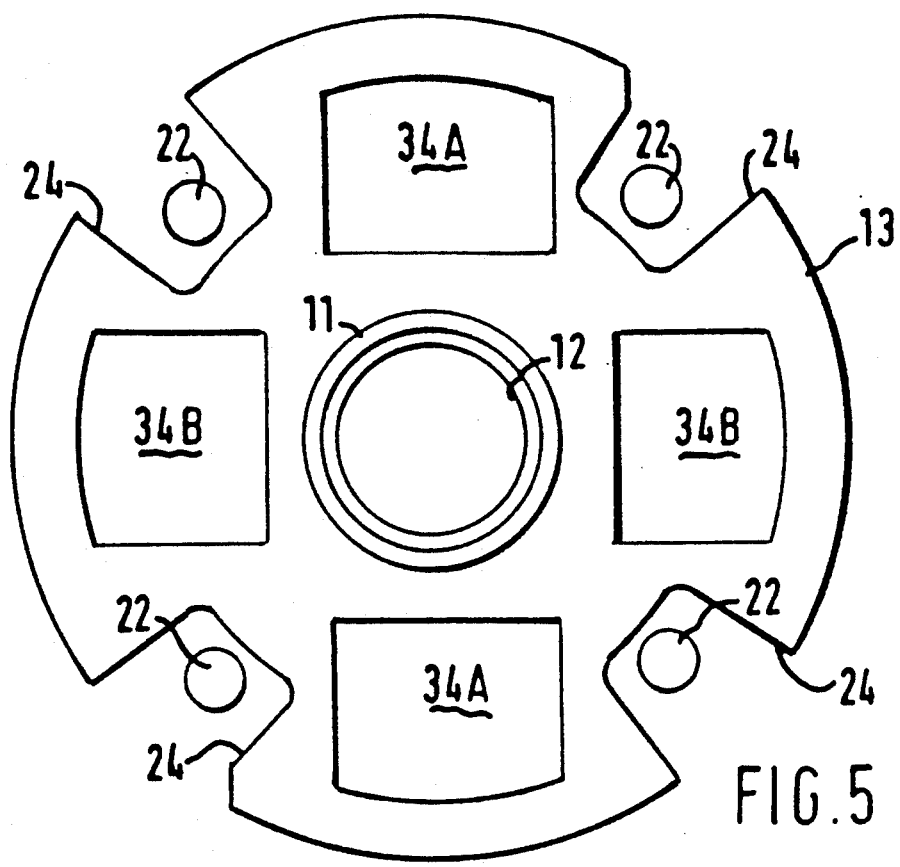
FIG. 5 is an elevation of the hub flange.
Figure 6:
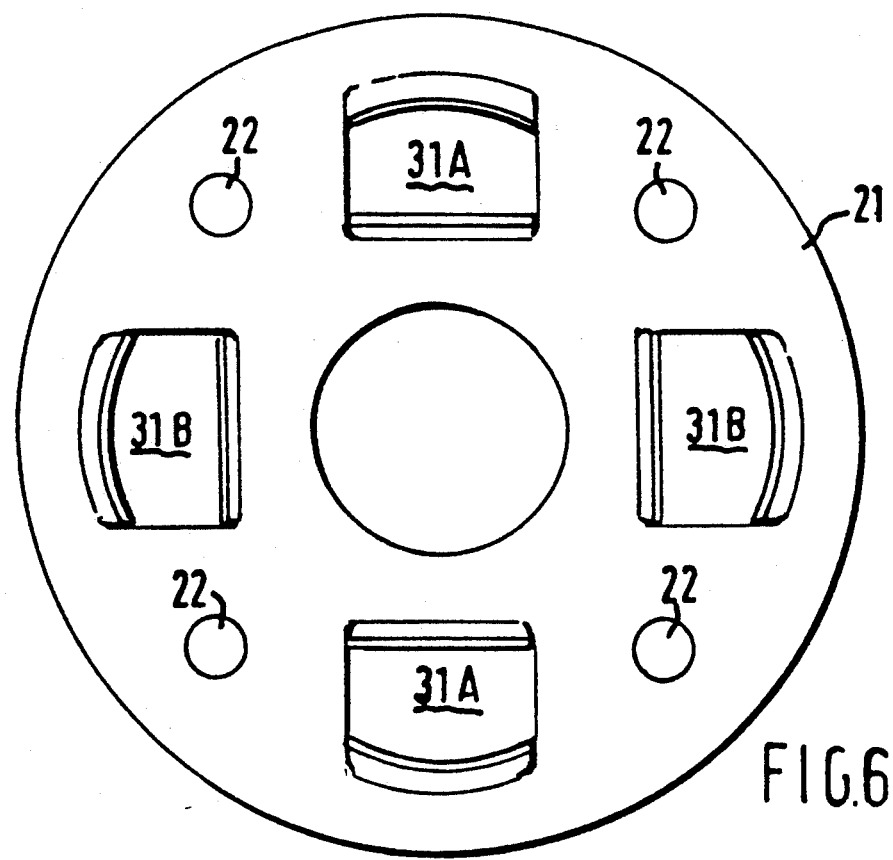
FIG. 6 is an elevation of the disc adaptor.
Figure 7A:
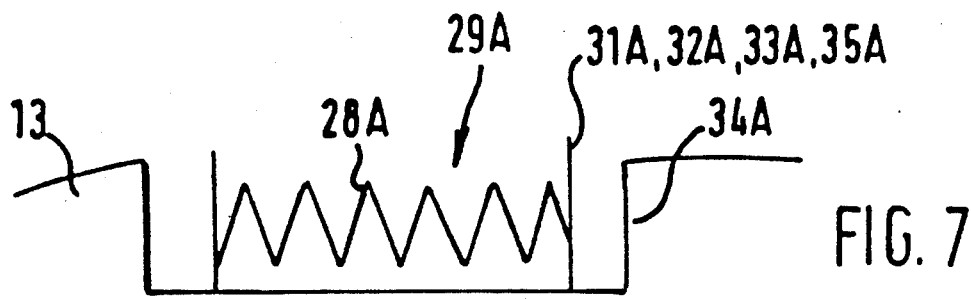
Figure 7B:
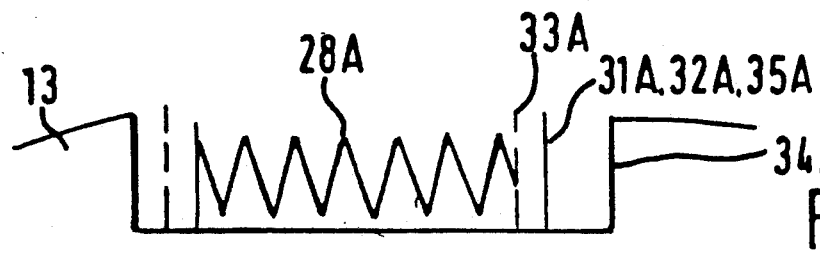
Figure 7C:
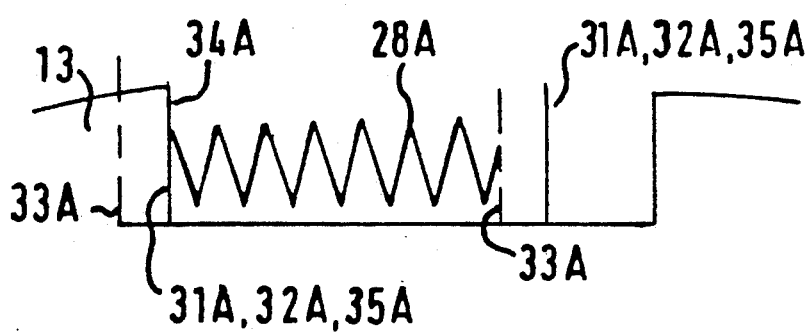

The facings 14 and 15 are secured to the fingers 18 of the respective carrier plate 16 or 17 by any suitable means e.g. rivets, integral rivets, tabs, adhesives. It has been found that silicone rubber adhesive 20 as shown in FIG. 2A which is laid onto the back face of the facing 15 in concentric circles, or spiral turns, is particularly suitable. The reader is directed to U.S. Pat. No. 4,821,860, U.S. Pat. No. 5,076,410 and pending U.S. Ser. No. 488,050 for a more detailed description of the adhesion of facings to a carrier plate of the present type using silicone rubber adhesives. In particular it is advantageous to use a silicone rubber adhesive 20 for the facing 15 adjacent the pressure plate P and a conventional rigid adhesive 20A for the facing 14 adjacent the flywheel F.

The carrier plates 16 and 17 are flat steel plates that are arranged back to back with the facings 14 and 15 directed in opposite directions for engagement in use with a flywheel F and pressure plate P. The two carrier plates 16 and 17 are located on one axial side of the hub flange 13 and are secured to a disc adaptor 21 located axially outwardly of the carrier plates 16 and 17 by four equiangularly spaced rivets or stop pins 22. The stop pins 22 also serve to secure the disc adaptor 21 to a retainer plate 23 located on the other axial side of the hub flange 13. The stop pins 22 pass through co-operating apertures 24 in the outer peripheral margin of the hub flange 13 so that the carrier assembly comprising the carrier plates 16, 17, disc adaptor 21, and retainer plate 23, can rotate relative to the hub 11.

The relative rotation is limited by abutment of the stop pins 22 with the radial ends of the apertures 24. The entire carrier assembly may be mounted to facilitate rotation on a bush 25 located between the hub 11 and the retainer plate 23.

The two carrier plates 16 and 17 are arranged so that one carrier plate 16 is fixed rotationally fast with the disc adaptor 21 by the stop pins 22 closely engaging in holes 26 in the plate 16, whereas the second carrier plate 17 is capable of limited angular rotation relative to the first carrier plate 16. This rotation is allowed by the pins 22 being accommodated by circumferentially elongated holes 27 in the plate 17, which allow for approximately 5 degrees of movement between the two carrier plates 16 & 17 in either direction of rotation, and for rotation of the second carrier plate 17 relative to the hub 11.

This arrangement could be reversed with the carrier plate 17 fixed on the stop pins 22 and the carrier plate 16 having the elongated holes therein to allow it to move around the hub. In yet a further embodiment, both carrier plates could have elongated apertures therein allowing each plate some limited circumferential movement.

The relative rotation of the friction facings 14 and 15 relative to the hub 11 is resisted by resilient means, preferably springs 28, housed in aligned sets of apertures 29, known as spring windows, in the hub flange 13, carrier plates 16 and 17, disc adaptor 21, and retainer plate 23. In the present embodiment there are four springs 28 housed in four sets of apertures 29 but other numbers of springs could be used, e.g. three to eight springs.

Each set of apertures 29 comprises a disc adaptor spring window 31, a fixed carrier plate spring window 32, a movable carrier plate spring window 33, a hub flange spring window 34, and a retainer plate spring window 35.

The springs 28 comprise two diametrically opposed light torsion damping springs 28A, and two diametrically opposed main torsion damping springs 28B. The light torsion damping springs 28A act to resist relative rotation initially between the two carrier plates 16 and 17, and thereafter between the carrier assembly and the hub 11.

The main torsion damping springs 28B act to resist relative rotation between the carrier assembly and the hub 11.

The light damping springs 28A are each housed in set of apertures 29A such that the respective carrier plate windows 32A, 33A, disc adaptor window 31A, and retainer plate window 31A all have the same circumferential length and in the 'at rest' position are all in alignment. The spring 28A is a tight fit in the set of apertures. This is shown schematically in FIG. 7(A). The respective hub flange window 34A is circumferentially longer than the other windows in the respective set 29A by an equivalent to 5 degrees of relative rotation at each end of the window.

The main torsion damping springs 28B are each housed in a set of apertures 29B such that the respective disc adaptor windows 31B, fixed carrier plate window 32B, hub flange window 34B, and retainer plate window 35B all have the same circumferential length and are all in alignment in the 'at rest' position. The main springs 28 B are a tight fit in the set of apertures. This is shown schematically in FIG. 8A. The respective moving carrier plate window 33B is circumferentially elongated compared with the other windows in the respective 29B set by an equivalent of about 5 degrees relative rotation at each end.

The operation of the friction clutch driven plate will now be described with the hub held stationary and a torque load applied to the friction facings to rotate the facings in the direction of arrow 'A' as shown in FIG. 1.

During the take up of the clutch, as the friction facings begin to frictionally engage between the pressure plate P and the flywheel F under the clamp load of the spring S (see FIG. 2), the friction facing 15 adjacent the pressure plate will normally engage first fractionally before the other facing engages with the flywheel.

As the friction facings 15 engage the pressure plate, the torsion load will rotate the moveable carrier plate 17 relative to the fixed carrier plate 16 which is held stationary relative to the hub 11 by the main torsion springs 28B engaging in the fixed carrier plate spring windows 32B. As the carrier plate 17 is rotated the light springs 28A are compressed between opposed radial faces in the spring windows 31A, 32A, and 35A, in the fixed carrier plate 17, the disc adaptor 21, and retainer plate 23, on the one hand, and the opposed radial face in the moveable carrier plate spring window 33A. This is shown schematically in FIG. 7(B).

Simultaneously, the clearance 'C' in the spring window 33B around the main torsion damping springs 28B, allows the moveable carrier plate 17 to rotate without interference from the main spring 28B until, the clearance 'C' has been taken up.

Figure 8A:
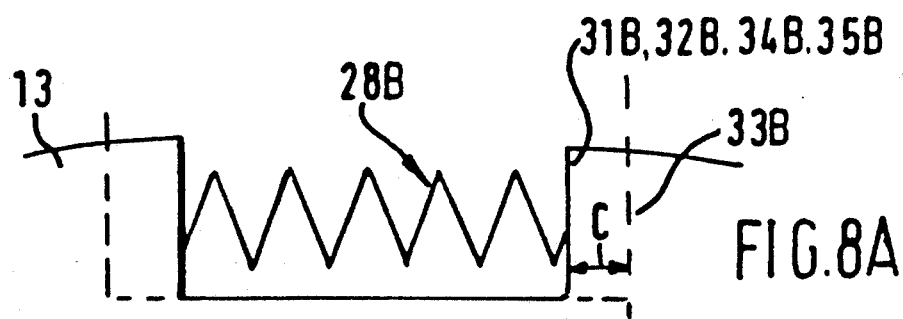
Figure 8B:
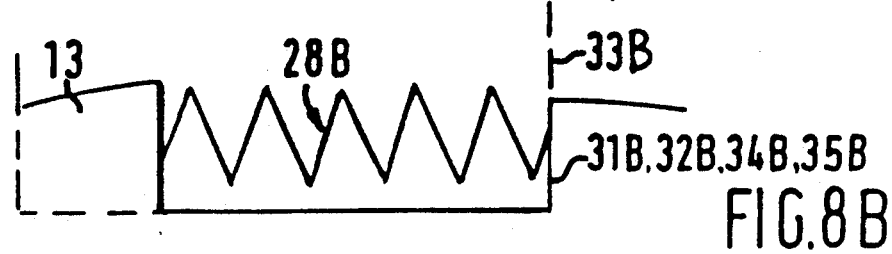

This is shown in FIG. 8B, and coincides with the position when the moveable carrier plate 17 engages the stop pins 22 through the ends of the apertures 27 and the relative position between the two carrier plates is then fixed, so that any further rotational movement of the facing 15 will also cause the carrier plate 16 to rotate and both plates will move together without further compression of the light spring 28A until the light spring 28A abuts the end of the hub aperture 34A.

The degree of rotation at which spring 28A comes against the end of hub flange window 34A may coincide with the abutment of the moveable carrier plate window 33B against the main torsion damping springs 28B (see FIG. 8B), and the abutment of the stop spring 22 against the ends of the apertures 27.

However the various clearances can be altered as is desired to achieve a required torque verses relative rotation curve.

Once the two carrier plates 16 and 17 are rotationally fixed, either by the abutment of the stop pins 22 against the ends of the apertures 27, or by the application of a sudden and large spring clamp load, then further rotation of the carrier assembly around the hub is resisted by all the springs 28 in the well known manner.

In an alternative embodiment (not shown), the clutch driven plate has an idle centre for damping out vibratory oscillations associated with gearbox idle rattle. Such a driven plate is illustrated in WO 88/08092.

Instead of the movable carrier plate 17 operating against low rate springs 28A housed in spring apertures in the main hub flange 13, the moving carrier plate could be arranged to operate against 'low rate' springs associated with the idle centre.

In yet a further embodiment the two carrier plates 16 and 17 could be arranged so that the fingers 18 are spring fingers which are shaped so that the facings 14 and 15 are spaced axially apart with the carrier plates providing some resilience when the facings are clamped together.

I claim:

1. A friction clutch driven plate having a hub, two annular coaxial carrier plates, and a pair of annular friction facings comprising a first facing and a second facing which face in opposite directions, the first friction facing for one direction being mounted on a respective one of said annular carrier plates, and the second friction facing for the other direction being mounted on the other of said annular carrier plates, each carrier plate being rotatable about the hub, the two carrier plates being secured back to back in contact with each other such that the carrier plates can rotate relative to each other, said relative rotation between the carrier plates being opposed by resilient means.

2. A friction clutch driven plate as claimed in claim 1, wherein the two carrier plates are secured back to back with each other by fastening means passing through aligned holes in the two carrier plates, said holes in at least one carrier plate being enlarged relative to the fastening means to enable said one carrier plate to move rotationally relative to the other carrier plate, said relative rotation being resisted by resilient means acting between the two carrier plates.

3. A friction clutch drive plate as claimed in claim 2 and in which the hub has a radially outwardly extending flange, and the two carrier plates are secured by said fastening means to a disc adaptor arranged on one axial side of the hub flange, and the disc adaptor is secured by an axially extending fastening means to a retainer plate which is located on the other axial side of the flange, the axially extending fastening means passing through co-operating apertures in the hub flange which allow the disc adaptor and retainer plate to move rotationally about the hub, said rotational movement being resiliently opposed by torsion damping springs housed in aligned spring windows in the hub flange, disc adaptor, and retainer plate.

4. A friction clutch driven plate as claimed in claim 3 wherein the fastening means utilised for securing the carrier plates to the disc adaptor are also utilised to secure the disc adaptor to the retainer plate.

5. A friction clutch driven plate as claimed in claim 4 wherein the two carrier plates are located axially between the disc adaptor and the hub flange.

6. A friction clutch driven plate as claimed in claim 3 wherein the two annular carrier plates extend radially inwardly to the hub and also have spring windows therein which align with the other said spring windows so that the carrier plate spring windows can accommodate the torsion damping springs.

7. A friction clutch driven plate as claimed in claim 6 wherein the relative rotational movement between the carrier plates is resisted by at least one spring housed in a set of said spring windows.

8. A friction clutch driven plate as claimed in claim 7 wherein main torsion damping springs are housed in aligned sets of spring windows in the carrier plates, disc adaptor, retainer plate and hub flange, and in each set of spring windows, the windows all have the same circumferential length excepting the windows in said one carrier plate which are circumferentially elongated, and the spring acting between the carrier plates is also housed in a set of spring windows in which the windows all have the same length excepting the bub flange window which is circumferentially elongated.

9. A friction clutch driven plate as claimed in claim 8 wherein for each set of main torsion damping spring windows the moveable carrier plate window is elongated by 5 degrees of movement at each circumferential end relative to the other spring windows in said set of windows.

10. A friction clutch driven plate as claimed in claim 5, wherein the moveable carrier plate is adjacent the hub flange.

11. A friction driven plate as claimed in claim 2 wherein the carrier plates are annular steel plates with a plurality of radially projecting circumferentially spaced fingers around the outer peripheral edge thereof, and the friction facings are secured to the projecting fingers.

12. A friction clutch driven plate as claimed in claim 11, wherein at least one of the friction facings is secured to its respective carrier plate by means of an elastomeric adhesive material.

13. A friction clutch driven plate as claimed in claim 12 wherein the adhesive is a silicone rubber adhesive.

14. A friction clutch driven plate as claimed in claim 2, wherein one friction facing is secured to its respective carrier plate by means of an elastomeric adhesive material and the other friction facing is secured to its respective carrier plate by a rigid adhesive.

15. A friction clutch driven plate as claimed in claim 14, wherein the other facing is in use, to be adjacent a flywheel of an internal combustion engine.

* * * * *